US012269937B2

United States Patent
Mun et al.

(10) Patent No.: US 12,269,937 B2
(45) Date of Patent: Apr. 8, 2025

(54) MODIFIED CONJUGATED DIENE-BASED POLYMER AND RUBBER COMPOSITION INCLUDING THE SAME

(71) Applicant: LG Chem, Ltd., Seoul (KR)

(72) Inventors: Min Sik Mun, Daejeon (KR); Ro Mi Lee, Daejeon (KR); Hyun Jun Kim, Daejeon (KR); No Ma Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 737 days.

(21) Appl. No.: 17/419,947

(22) PCT Filed: Sep. 2, 2020

(86) PCT No.: PCT/KR2020/011779
§ 371 (c)(1),
(2) Date: Jun. 30, 2021

(87) PCT Pub. No.: WO2021/085829
PCT Pub. Date: May 6, 2021

(65) Prior Publication Data
US 2022/0064416 A1 Mar. 3, 2022

(30) Foreign Application Priority Data
Oct. 30, 2019 (KR) .................. 10-2019-0136536

(51) Int. Cl.
*C08L 15/00* (2006.01)
*C08C 19/22* (2006.01)
(Continued)

(52) U.S. Cl.
CPC .............. *C08L 15/00* (2013.01); *C08C 19/22* (2013.01); *C08C 19/25* (2013.01); *C08K 3/04* (2013.01); *C08K 3/36* (2013.01); *B60C 1/00* (2013.01)

(58) Field of Classification Search
CPC ...... C08F 2500/04; C08F 210/16; C08F 4/24; C08F 4/69; C08F 2/001; C08F 210/14;
(Continued)

(56) References Cited

U.S. PATENT DOCUMENTS 5,665,812 A 9/1997 Gorce et al.
2014/0296376 A1 10/2014 Sato et al.
(Continued)

FOREIGN PATENT DOCUMENTS

CN 109563180 A 4/2019
EP 3059258 A1 8/2016
(Continued)

OTHER PUBLICATIONS

Bristow J. Nat. Rubb. Res. 53(3), 183-198 (Year: 1990).*
(Continued)

*Primary Examiner* — Mark S Kaucher
(74) *Attorney, Agent, or Firm* — Lerner David LLP (57) ABSTRACT

A modified conjugated diene-based polymer and a rubber composition including the same are disclosed herein. In some embodiments, a modified conjugated diene-based polymer satisfying the conditions of i) a mooney viscosity from 75 to less than 100, measured in accordance with ASTM D1646 at 110° C., ii) a mooney stress relaxation ratio 0.4 or less, measured at 110° C., iii) a weight average molecular weight (Mw) of 750,000 g/mol or more, and iv) a molecular weight distribution from 1.0 to 2.0, wherein the molecular weight distribution is a ratio of Mw to the number average molecular weight (Mn).

9 Claims, 2 Drawing Sheets

(51) Int. Cl.
*C08C 19/25* (2006.01)
*C08K 3/04* (2006.01)
*C08K 3/36* (2006.01)
*B60C 1/00* (2006.01)

(58) Field of Classification Search
CPC .............. C08F 2500/10; C08F 2500/06; C08F 2500/12; C08L 23/0815; C08L 23/06
See application file for complete search history.

(56) References Cited

U.S. PATENT DOCUMENTS

| | | |
|---|---|---|
| 2016/0177011 A1 | 6/2016 | Kim et al. |
| 2017/0058055 A1 | 3/2017 | Lee et al. |
| 2017/0275401 A1 | 9/2017 | Oh et al. |
| 2018/0037674 A1 | 2/2018 | Yamada et al. |
| 2019/0203021 A1* | 7/2019 | Kyo .................... C08L 19/006 |
| 2019/0256635 A1 | 8/2019 | Kim et al. |
| 2020/0002454 A1 | 1/2020 | Lee et al. |
| 2020/0231788 A1 | 7/2020 | Lee et al. |
| 2020/0277426 A1 | 9/2020 | Oh et al. |

FOREIGN PATENT DOCUMENTS

| | | |
|---|---|---|
| EP | 3093297 A1 | 11/2016 |
| EP | 3502144 A1 | 6/2019 |
| EP | 3511350 A1 | 7/2019 |
| EP | 3536721 A1 | 9/2019 |
| EP | 3919532 A1 | 12/2021 |
| KR | 100352736 B1 | 12/2002 |
| KR | 101321316 B1 | 10/2013 |
| KR | 20160003440 A | 1/2016 |
| KR | 20160060562 A | 5/2016 |
| KR | 20170000811 A | 1/2017 |
| KR | 101857392 B1 | 6/2018 |
| KR | 20180084603 A | 7/2018 |
| KR | 20190030216 A | 3/2019 |
| KR | 20190066573 A | 6/2019 |
| WO | 2013077018 A1 | 4/2015 |
| WO | 2016133202 A1 | 8/2016 |
| WO | 2018034217 A1 | 2/2018 |

OTHER PUBLICATIONS

Niemiec Polymer Testing 1 201-209 (Year: 1980).*
Extended European Search Report including Written Opinion for Application No. 20880896.4 dated Feb. 4, 2022, pp. 1-7.
Search Report dated Feb. 15, 2023 from the Office Action for Chinese Application No. 202080008077.7 issued Feb. 16, 2023, pp. 1-2. [See p. 1, categorizing the cited references].
International Search Report for Application No. PCT/KR2020/011779 mailed Dec. 14, 2020, pp. 1-2.

* cited by examiner

MODIFIED CONJUGATED DIENE-BASED POLYMER AND RUBBER COMPOSITION INCLUDING THE SAME

CROSS-REFERENCE TO RELATED APPLICATIONS

The present application is a national phase entry under 35 U.S.C. § 371 of International Application No. PCT/KR2020/011779, filed on Sep. 2, 2020, which claims priority from Korean Patent Application No. 10-2019-0136536, filed on Oct. 30, 2019, the entire contents of which are incorporated herein by reference.

TECHNICAL FIELD

The present invention relates to a modified conjugated diene-based polymer and a rubber composition including the same.

BACKGROUND ART

Recently, according to the growing attention on energy saving and environmental issues, the decrease of the fuel consumption ratio of cars is required, and accordingly, materials having modulational stability represented by wet skid resistance as well as low running resistance and excellent abrasion resistance and tensile properties is required as rubber materials for tires.

In order to reduce the running resistance of tires, there is a method of reducing hysteresis loss of vulcanized rubber, and rebound resilience at 50° C. to 80° C., tan 5, Goodrich heating, or the like is used as an evaluation index of the vulcanized rubber. That is, it is desirable to use a rubber material having high rebound resilience at the above temperature or a low tan 5 value or Goodrich heating.

As a method for accomplishing the requirement, a method for decreasing the heating properties of tires using an inorganic filler such as silica and carbon black in a rubber composition for forming tires has been suggested. However, the dispersion of the inorganic filler in the rubber composition is not favorable, and defects of degrading overall physical properties of the rubber composition including abrasion resistance, crack resistance or processability arise.

In order to solve such problems, a method for modifying the polymerization active part of a conjugated diene-based polymer which is obtained by anionic polymerization using an organolithium with a modifier containing a functional group which is capable of interacting with an inorganic filler, has been suggested as a method for increasing the dispersibility of an inorganic filler such as silica and carbon black in a rubber composition. However, even the low heating properties are improved, tensile properties, abrasion resistance and processability are still deteriorated.

PRIOR ART DOCUMENT

Patent Document (Patent Document 1) JP WO2013-077018 A1

DISCLOSURE OF THE INVENTION

Technical Problem

The present invention has been devised to solve the above-mentioned problems of the conventional technique, and an object is to provide a modified conjugated diene-based polymer which is capable of controlling the modulus and tensile strength of a rubber composition, if applied to the rubber composition, by controlling the mooney viscosity, the mooney stress relaxation ratio, the molecular weight and the molecular weight distribution of the modified conjugated diene-based polymer.

In addition, an object of the present invention is to provide a rubber composition including the modified conjugated diene-based polymer and a filler, and having excellent green strength such that a modulus and tensile strength are controlled to specific ranges or more, and thus having excellent processability.

Technical Solution

To solve the above-described tasks, according to an embodiment of the present invention, the present invention provides a modified conjugated diene-based polymer satisfying the following conditions of i) to iv): i) a mooney viscosity measured in ASTM D1646 conditions and at 110° C.: from 75 to less than 100, ii) a mooney stress relaxation ratio measured at 110° C.:0.4 or less, iii) a weight average molecular weight: 750,000 g/mol or more, and iv) molecular weight distribution (PDI; MWD): from 1.0 to 2.0.

In addition, the present invention provides a rubber composition including the modified conjugated diene-based polymer and a filler.

Advantageous Effects

The modified conjugated diene-based polymer according to the present invention has a mooney viscosity, a mooney stress relaxation ratio, a weight average molecular weight and molecular weight distribution, which are controlled in specific ranges in combination, and may be applied to a rubber composition to control the 10% modulus and tensile strength of the rubber composition to specific numerical ranges or more.

In addition, the rubber composition according to the present invention may have 10% modulus and tensile strength controlled in specific numerical ranges by including the modified conjugated diene-based polymer, and accordingly, may have increased green strength and excellent processability.

BRIEF DESCRIPTION OF THE DRAWINGS

The drawings attached to the present specification illustrate preferred examples of the present invention, and serve to enable the further understanding of the technical concept of the present invention together with the detailed description, and therefore the present invention should not be interpreted only with matters in such drawings.

FIGS. 1A to 1D shows the evaluation standard of processability properties according to embodiments of the present invention, wherein

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition

The term "polymer" in the present invention refers to a polymer compound prepared by polymerizing monomers irrespective of the same or different kinds of monomers. Likewise, the general term polymer refers to a polymer prepared by only one kind of monomer and includes commonly used terms homopolymer and copolymer.

The term "1,2-vinyl bond content" in the present invention refers to the mass (or weight) percent of butadiene included in 1 and 2 positions in a polymer chain on the basis of a conjugated diene monomer (butadiene, etc.) moiety (on the basis of the total weight of polymerized butadiene) in the polymer.

In the present invention, the term "monovalent hydrocarbon group" may mean a monovalent atomic group obtained by bonding carbon and hydrogen in a monovalent alkyl group, alkenyl group, alkynyl group, cycloalkyl group, and aryl group including one or more unsaturated bonds. The minimum carbon number of a substituent represented by the monovalent hydrocarbon may be determined according to the kind of each substituent.

In the present invention, the term "divalent hydrocarbon group" may mean a divalent atomic group obtained by bonding carbon and hydrogen in a divalent alkylene group, alkenylene group, alkynylene group, cycloalkylene group, and arylene group including one or more unsaturated bonds. The minimum carbon number of a substituent represented by the divalent hydrocarbon may be determined according to the kind of each substituent.

In the present invention, the term "alkyl group" may mean a monovalent aliphatic saturated hydrocarbon and may include both linear alkyl group such as methyl, ethyl, propyl and butyl, and branched alkyl group such as isopropyl, sec-butyl, tert-butyl and neo-pentyl.

In the present invention, the term "alkenyl group" may mean a monovalent aliphatic unsaturated hydrocarbon including one or two or more double bonds.

In the present invention, the term "alkynyl group" may mean a monovalent aliphatic unsaturated hydrocarbon including one or two or more triple bonds.

In the present invention, the term "alkylene group" may mean a divalent aliphatic saturated hydrocarbon such as methylene, ethylene, propylene and butylene.

In the present invention, the term "aryl group" may mean aromatic hydrocarbon and may include both monocyclic aromatic hydrocarbon in which one ring is formed and polycyclic aromatic hydrocarbon in which two or more rings are combined.

In the present invention, the term "heterocyclic group" is obtained by substituting carbon atoms in a cycloalkyl group or an aryl group with one or more heteroatoms and may mean, for example, both a heterocycloalkyl group and a heteroaryl group.

In the present invention, the terms "comprising", and "having" and the derivatives thereof, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

In the present invention, the term "coupling number (C.N.)" represents the coupling or not between polymer chains in a polymer, may represent the ratio of a polymer chain composed of only terminal modification without coupling between polymer chains and a polymer chain in which a plurality of polymer chains are coupled with one modifier, and may be dependent on the number of functional groups which may be coupled with an active terminal of a polymer chain present in a modifier for modifying a polymer. Accordingly, the coupling number may have a range of $1 \leq C \cdot N \leq F$, where F means the number of functional groups which may react with an active polymer terminal in a modifier. It means that if a coupling number is 1, the entire polymer chains composing the polymer are uncoupled, and if the coupling number is F, the entire polymer chains are coupled.

Measurement Method and Conditions

In the present disclosure, the "1,2-vinyl bond content" is measured and analyzed using Varian VNMRS 500 MHz NMR, and the 1,2-vinyl bond content in each polymer is calculated and measured by using 1,1,2,2-tetrachloroethane as a solvent during measuring NMR, and calculating 6.0 ppm as a solvent peak, 7.2-6.9 ppm as random styrene peaks, 6.9-6.2 ppm as block styrene peaks, 5.8-5.1 ppm as 1,4-vinyl and 1,2-vinyl peaks, and 5.1-4.5 ppm as 1,2-vinyl peaks.

In the present disclosure, "weight average molecular weight (Mw)", "number average molecular weight (Mn)", and "molecular weight distribution (MWD)" are measured through gel permeation chromatography (GPC) analysis and are measured by checking a molecular weight distribution curve. The molecular weight distribution (PDI, MWD, Mw/Mn) is calculated from each molecular weight measured. Particularly, the GPC uses two columns of PLgel Olexis (Polymer laboratories Co.) and one column of PLgel mixed-C (Polymer Laboratories Co.) in combination, and polystyrene (PS) is used as a GPC standard material for calculating the molecular weights, and tetrahydrofuran mixed with 2 wt % of an amine compound is used as a GPC measurement solvent.

In the present disclosure, for measuring the "mooney viscosity (MV)" and "mooney stress relaxation ratio (−S/R)", the mooney viscosity (MV, (ML1+4, @100° C. MU) is measured using MV-2000 (ALPHA Technologies Co.) using Large Rotor at a rotor speed of 2±0.02 rpm at 110° C. In this case, a specimen used is stood at room temperature (23±3° C.) for 30 minutes or more, and 27±3 g of the specimen is collected and put in a die cavity, and then, Platen is operated for 4 minutes for measurement. After measuring the mooney viscosity, the slope value of the change of the mooney viscosity shown while releasing torque is measured, and the absolute value thereof is considered as the mooney stress relaxation ratio.

In the present disclosure, the "Si content" is measured using an inductively coupled plasma optical emission spectroscopy (ICP-OES; Optima 7300DV) as an ICP analysis method. If the inductively coupled plasma optical emission spectroscopy is used, measurement is performed by adding about 0.7 g of a specimen to a platinum (Pt) crucible, adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:
1) step 1: initial temp 0° C., rate (temp/hr) 180° C./hr, temp (holdtime) 180° C. (1 hr),
2) step 2: initial temp 180° C., rate (temp/hr) 85° C./hr, temp (holdtime) 370° C. (2 hr), and
3) step 3: initial temp 370° C., rate (temp/hr) 47° C./hr, temp (holdtime) 510° C. (3 hr),
adding 1 mL of concentrated nitric acid (48 wt %) and 20 µl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 ml of ultrapure water, and performing incineration.

In the present disclosure, the "N content" may be measured through an NSX analysis method, and measurement by the NSX analysis method may use a quantitative analyzer of a trace amount of nitrogen (NSX-2100H). For example, in case of using the quantitative analyzer of a trace amount of nitrogen, the quantitative analyzer of a trace amount of nitrogen (Auto sampler, Horizontal furnace, PMT & Nitrogen detector) is turned on, carrier gas flow amounts are set to 250 ml/min for Ar, 350 ml/min for $O_2$, and 300 ml/min for ozonizer, a heater is set to 800° C., and the analyzer is stood for about 3 hours for stabilization. After stabilizing the analyzer, a calibration curve of calibration curve ranges of 5 ppm, 10 ppm, 50 ppm, 100 ppm and 500 ppm is made using Nitrogen standard (AccuStandard S-22750-01-5 ml), and an area corresponding to each concentration is obtained. Then, by using the ratios of concentrations to areas, a straight line is made. After that, a ceramic boat holding 20 mg of a specimen is put in the auto sampler of the analyzer and measurement is conducted to obtain an area. By using the area of the specimen thus obtained and the calibration curve, the N content is calculated. In this case, the specimen is a modified conjugated diene-based polymer from which solvents are removed by putting the specimen in hot water heated by steam and stirring, and may be a specimen from which remaining monomers, remaining modifiers and oil are removed.

In the present disclosure, "M10 (10% modulus) and tensile strength" were obtained by manufacturing each specimen based on the tensile test method of ASTM D6746 and measuring the tensile strength of the specimen when broken and the tensile stress when expanded by 10% (10% modulus). Particularly, the tensile properties were measured using a Universal Test Machin 4204 (Instron Co.) tensile tester at room temperature in a rate of 50 cm/min.

The present invention provides a modified conjugated diene-based polymer having physical properties in specific ranges in combination and, if applied to a rubber composition, capable of controlling the modulus and tensile strength of the rubber composition to specific numerical ranges or more.

The modified conjugated diene-based polymer according to an embodiment of the present invention is characterized in satisfying the following conditions of i) to iv) at the same time:
i) a mooney viscosity measured in ASTM D1646 conditions and at 110° C.: from 75 to less than 100,
ii) a mooney stress relaxation ratio measured at 110° C.:0.4 or less,
iii) a weight average molecular weight: 750,000 g/mol or more, and
iv) molecular weight distribution (PDI; MWD): from 1.0 to 2.0.

According to an embodiment of the present invention, the modified conjugated diene-based polymer may include a repeating unit derived from a conjugated diene-based monomer and a functional group derived from a modifier, and here, the repeating unit derived from a conjugated diene-based monomer may mean a repeating unit formed by a conjugated diene-based monomer during polymerization, and the functional group derived from a modifier may mean a functional group derived from a modifier, which is present at least one terminal of an active polymer through the reaction or coupling between an active polymer prepared by the polymerization of the conjugated diene-based monomer and a modifier.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

In addition, the modified conjugated diene-based polymer may be a copolymer further including a repeating unit derived from an aromatic vinyl monomer and in this case, may include 30 wt % or more, or 30 wt % to 50 wt % of the repeating unit derived from an aromatic vinyl monomer. Within this range, effects of excellent balance between rotation resistance and wet skid resistance may be achieved.

The aromatic vinyl monomer may be, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene.

In another embodiment, the modified conjugated diene-based polymer may be a copolymer further including a repeating unit derived from a diene-based monomer of 1 to 10 carbon atoms together with the repeating unit derived from a conjugated diene-based monomer. The repeating unit derived from a diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in an amount of greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

According to an embodiment of the present invention, the copolymer may be a random copolymer, and in this case, effects of excellent balance between physical properties may be achieved. The random copolymer may mean the arrangement of repeating units forming a copolymer in disorder.

The modified conjugated diene-based polymer according to an embodiment of the present invention is required to satisfy the mooney viscosity measured in conditions of ASTM D1646 at 110° C. of 75 to less than 100, particularly, 85 to less than 100. Within the above-described range, processability may become significantly excellent.

In addition, the modified conjugated diene-based polymer is required to satisfy the mooney stress relaxation ratio (−S/R) measured at 110° C. of 0.4 or less. The mooney stress relaxation ratio may become indexes of the degree of branching and molecular weight of a corresponding modified conjugated diene-based copolymer, and particularly, the mooney stress relaxation ratio may be 0.35 or less, or 0.3 or less. In addition, the decrease of the mooney stress relaxation ratio may mean the increase of the degree of branching and the molecular weight, and the lower limit thereof is not specifically limited but may be 0.05 or more.

The mooney stress relaxation ratio measured at 110° C. may become the indexes of the degree of branching and molecular weight of the modified conjugated diene-based polymer as described above, and according to the decrease of the mooney stress relaxation ratio, the degree of branching and molecular weight of the modified conjugated diene-based polymer tend to increase. However, generally, the mooney stress relaxation ratio may be concerned with the mooney viscosity. With the equal level of mooney viscosity, the mooney stress relaxation ratio may become quite different according to the degree of branching of the polymer. For example, the mooney stress relaxation ratio may decrease with the increase of the branches of the modified conjugated diene-based polymer and thus, with the equal level of mooney viscosity, the mooney stress relaxation ratio may not be the same due to the difference of the degree of branching.

Meanwhile, since the modified conjugated diene-based polymer according to an embodiment of the present invention satisfies the aforementioned mooney stress relaxation ratio at the aforementioned mooney viscosity, processability may be excellent, the degree of branching may be controlled, and mechanical properties such as tensile strength may be excellent.

In addition, the control of the mooney relaxation ratio to 0.4 or less may be achieved by, for example, controlling the weight average molecular weight and the degree of branching of the polymer thus prepared in a mooney viscosity range of a modified conjugated diene-based polymer of 75 to less than 100. The control may be achieved by increasing the degree of branching in case where the weight average molecular weight decreases, and by decreasing the degree of branching in case where the weight average molecular weight increases, or by the number of the functional groups of a modifier, the addition amount of a modifier, or the degree of progress of metalation.

In addition, the modified conjugated diene-based polymer according to an embodiment of the present invention may have a weight average molecular weight (Mw) measured by gel permeation chromatography (GPC) of 750,000 g/mol or more, particularly, 750,000 g/mol to 1,200,000 g/mol, or 750,000 g/mol to 1,000,000 g/mol. Within this range, effects of excellent rotation resistance and wet skid resistance may be achieved.

In addition, the modified conjugated diene-based polymer may have molecular weight distribution (PDI; MWD; Mw/Mn) of 1.0 to 2.0, particularly, 1.5 to 2.0, and within this range, tensile properties and viscoelasticity properties are excellent, and excellent balance between physical properties may be achieved.

Meanwhile, the modified conjugated diene-based polymer may have a number average molecular weight (Mn) of 1,000 g/mol to 2,000,000 g/mol, 10,000 g/mol to 1,000,000 g/mol, or 100,000 g/mol to 800,000 g/mol.

In another embodiment, the modified conjugated diene-based polymer has a unimodal shape molecular weight distribution curve by gel permeation chromatography (GPC), and the unimodal curve shape may be determined in view of continuous type polymerization method, and in view of modification reaction which is conducted by a modifier or a coupling agent.

In addition, the modified conjugated diene-based polymer according to an embodiment of the present invention is required to satisfy the 1,2-vinyl bond content of 30.0 wt % or less with respect to the total weight of the polymer. The vinyl content may mean the wt % of not 1,4-added but 1,2-added conjugated diene-based monomer with respect to a conjugated diene-based copolymer composed of a monomer having a vinyl group and an aromatic vinyl-based monomer, and may be affected by the termination point of polymerization reaction, reaction environments at the termination point of polymerization reaction, etc., during polymerization.

Particularly, the 1,2-vinyl bond content may be 5 to 30 wt %, preferably, 5 to 15 wt %, and according to the 1,2-vinyl bond content, abrasion properties and rotation resistance properties may be affected. If the 1,2-vinyl bond content is greater than 30 wt %, abrasion resistance properties may be extremely deteriorated. Thus, reaction conditions need to pay attention so that the 1,2-vinyl bond content satisfies the above-described range during preparing the modified conjugated diene-based polymer.

In addition, the modified conjugated diene-based polymer may have a coupling number of 3.2 or more, particularly, 3.2 to 5.0, and within this range, the mooney stress relaxation ratio may be more easily controlled to the aforementioned range within the above described ranges of the mooney viscosity and weight average molecular weight.

The modified conjugated diene-based polymer according to an embodiment of the present invention may include a Si atom and a N atom in a molecule, and the Si content and N content based on the total weight of the polymer may be 50 ppm or more, 70 ppm to 10,000 ppm, or 100 ppm to 5,000 ppm, respectively, and within these ranges, a rubber composition including the modified conjugated diene-based polymer has effects of showing excellent mechanical properties such as tensile properties and viscoelasticity properties. The N content and the Si content may mean the amount of N atoms and the amount of Si atoms, respectively, present in the modified conjugated diene-based polymer. Meanwhile, the N atom and the Si atom may be derived from a modifier.

As described above, if the modified conjugated diene-based polymer according to the present invention satisfies the above-described conditions at the same time and is applied to a rubber composition, the modulus and tensile strength of the rubber composition may be controlled to specific numerical ranges or more, and as a result, the green strength of the rubber composition may increase, tearing phenomenon during processing may be restrained, and processability may be increased.

Meanwhile, the modifier modifying the modified conjugated diene-based polymer in the present invention may be a modifier having affinity with silica, and as described above, the mooney stress relaxation ratio and coupling number may be dependent on the number of the functional groups of the modifier. Accordingly, in order to meet the mooney stress relaxation ratio and/or coupling number of the modified conjugated diene-based polymer in the above-described ranges, the modifier may have at least four or more functional groups which are capable of reacting with an active polymer chain.

Particularly, the modifier may be a modifier including a functional group having affinity with silica in a compound used as the modifier. Such a functional group having affinity with silica may mean a functional group having excellent affinity with a filler, particularly, a silica-based filler, and capable of making interaction between the silica-based filler and the functional group derived from the modifier.

The modifier may be, for example, an alkoxysilane-based modifier, particularly, an alkoxysilane-based modifier containing one or more heteroatoms including a nitrogen atom, an oxygen atom, or a sulfur atom. If the alkoxysilane-based modifier is used, via substitution reaction between an anionic active part positioned at one terminal of an active polymer and an alkoxy group of the alkoxysilane-based modifier, the one terminal of the active polymer may be modified or coupled in a bonding state with a silyl group.

According to an embodiment of the present invention, the modifier may include a compound represented by Formula 1 below.

[Formula 1]

In Formula 1, $R^1$ may be a single bond, or an alkylene group of 1 to 10 carbon atoms, $R^2$ and $R^3$ may be each independently an alkyl group of 1 to 10 carbon atoms, $R^4$ may be hydrogen, an alkyl group of 1 to 10 carbon atoms, a divalent, trivalent, or tetravalent alkylsilyl group which is substituted with an alkyl group of 1 to 10 carbon atoms, or a heterocycle of 2 to 10 carbon atoms, $R^{21}$ may be a single bond, an alkylene group of 1 to 10 carbon atoms, or —[$R^{42}$O]$_j$—, where $R^{42}$ may be an alkylene group of 1 to 10 carbon atoms, a and m may be each independently an integer selected from 2 or 3, n may be an integer of 0 or 1, and j may be an integer selected from 1 to 30.

In a particular embodiment, in Formula 1, $R^1$ may be a single bond, or an alkylene group of 1 to 5 carbon atoms, $R^2$ and $R^3$ may be each independently hydrogen, an alkyl group of 1 to 5 carbon atoms, $R^4$ may be hydrogen, an alkyl group of 1 to 5 carbon atoms, a tetravalent alkylsilyl group which is substituted with an alkyl group of 1 to 5 carbon atoms, or a heterocycle of 2 to 5 carbon atoms, $R^{21}$ may be a single bond, an alkylene group of 1 to 5 carbon atoms, or —[$R^{42}$O]$_j$—, where $R^{42}$ may be an alkylene group of 1 to 5 carbon atoms, a and m may be an integer of 2 or 3, n may be an integer of 0 or 1, where m+n=3 may be satisfied, and j may be an integer selected from 1 to 10.

In Formula 1, if $R^4$ is a heterocycle, the heterocycle may be unsubstituted or substituted with a trisubstituted alkoxysilyl group, and if the heterocycle is substituted with a trisubstituted alkoxysilyl group, the trisubstituted alkoxysilyl group may be substituted via the connection with the heterocycle by an alkylene group of 1 to 10 carbon atoms, and the trisubstituted alkoxysilyl group may mean an alkoxysilyl group which is substituted with an alkoxy group of 1 to 10 carbon atoms.

In a more particular embodiment, the compound represented by Formula 1 may be one selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, tri(trimethoxysilyl)amine, tri-(3-(trimethoxysilyl)propyl)amine, N,N-bis(3-(diethoxy(methyl)silyl)propyl)-1,1,1-trimethylsilanamine, N-(3-(1H-1,2,4-triazole-1-yl)propyl)-3-(trimethoxysilyl)-N-(3-(trimethoxysilyl)propyl)propan-1-amine, 3-(trimethoxysilyl)-N-(3-(trimethoxysilyl)propyl)-N-(3-(1-(3-(trimethoxysilyl)propyl)-1H-1,2,4-triazol-3-yl)propyl)propan-1-amine, and N,N-bis(3-(triethoxysilyl)propyl)-2,5,8,11,14-pentaoxahexadecan-16-amine.

In another embodiment, the modifier may include a compound represented by Formula 2 below.

[Formula 2]

In Formula 2, $R_{b1}$ is an alkyl group of 1 to 10 carbon atoms, —$R_{b19}SiR_{b9}R_{b10}R_{b11}$ or —$R_{b12}A$, where $R_{b9}$ to $R_{b11}$ are each independently an alkyl group of 1 to 10 carbon atoms, $R_{b12}$ is an alkylene group of 1 to 10 carbon atoms, $R_{b19}$ is a single bond or an alkylene group of 1 to 10 carbon atoms, and A is a substituent represented by Formula 2a below, $R_{b2}$ to $R_{b4}$ are each independently an alkylene group of 1 to 10 carbon atoms, and $R_{b5}$ to $R_{b8}$ are each independently an alkyl group of 1 to 10 carbon atoms,

[Formula 2a]

In Formula 2a, $R_{b13}$ and $R_{b14}$ are each independently an alkylene group of 1 to 10 carbon atoms, $R_{b15}$ to $R_{b18}$ are each independently an alkyl group of 1 to 10 carbon atoms, $m_1$ and $m_2$ are each independently an integer of 1 to 3, where if A is —$R_{b19}SiR_{b9}R_{b10}R_{b11}$, $m_1+m_2 \geq 4$ is satisfied, and $m_3$ and $m_4$ are each independently an integer of 1 to 3.

In a particular embodiment, in Formula 2, $R_{b1}$ is an alkyl group of 1 to 6 carbon atoms, —$R_{b19}SiR_{b9}R_{b10}R_{b11}$ or —$R_{b12}A$, where $R_{b9}$ to $R_{b11}$ are each independently an alkyl group of 1 to 6 carbon atoms, $R_{b12}$ is an alkylene group of 1 to 6 carbon atoms, $R_{b19}$ is a single bond or an alkylene group of 1 to 6 carbon atoms, and A is a substituent represented by Formula 2a, $R_{b2}$ to $R_{b4}$ are each independently an alkylene group of 1 to 6 carbon atoms, and $R_{b5}$ to $R_{b8}$ are each independently an alkyl group of 1 to 6 carbon atoms, and in Formula 2a, $R_{b13}$ and $R_{b14}$ are each independently an alkylene group of 1 to 6 carbon atoms, $R_{b15}$ to $R_{b18}$ are each independently an alkyl group of 1 to 6 carbon atoms, $m_1$ and $m_2$ are each independently an integer of 1 to 3, where if A is —$R_{b19}SiR_{b9}R_{b10}R_{b11}$, $m_1+m_2 \geq 4$ is satisfied, and $m_3$ and $m_4$ are each independently an integer of 1 to 3.

More particularly, the compound represented by Formula 3 may be one or more selected from the compounds represented by Formula 2-1 to Formula 2-3 below.

In Formula 2-1 to Formula 2-3, $R_{b2}$ to $R_{b8}$, and $R_{b12}$ to $R_{b19}$ are the same as defined above, and $m_1$ to $m_4$ are each independently an integer of 1 to 3, where $m_1+m_2 \geq 4$ is satisfied.

Meanwhile, the modified conjugated diene-based polymer according to an embodiment of the present invention may be prepared through a preparation method in which polymerization temperature, polymerization time, amounts used of reactants, etc. are controlled to meet the above-described mooney viscosity, mooney stress relaxation ratio, weight average molecular weight and molecular weight distribution, and additionally coupling number.

For example, the method for preparing the modified conjugated diene-based polymer may include a step of polymerizing a conjugated diene-based monomer in the presence of an organometallic compound in a hydrocarbon solvent to prepare an active polymer which is coupled with an organometal (S1); and a step of reacting the active polymer prepared in step (S1) with a modifier (S2), wherein polymerization reaction (S1) and modification reaction (S2) are performed by a continuous type, step (S1) is performed in two or more polymerization reactors, a polymerization conversion ratio in a first polymerization reactor among the polymerization reactors is 50% or less, and the modification reaction in step (S2) is performed by injecting the modifier in at least two installments.

Hereinafter, the modified conjugated diene-based polymer thus prepared, and the characteristics of the modifier used in the reaction are overlapped with the above-description, and the explanation thereon will be omitted.

The hydrocarbon solvent is not specifically limited, but may be, for example, one or more selected from the group consisting of n-pentane, n-hexane, n-heptane, isooctane, cyclohexane, toluene, benzene and xylene.

According to an embodiment of the present invention, the organometallic compound may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer. The organometallic compound may be, for example, one or more selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

The polymerization of step (S1) may be, for example, an anionic polymerization, and particularly, a living anionic polymerization by which an anionic active part is formed at the polymer terminal through a propagation reaction by anions. In addition, the polymerization of step (S1) may be a polymerization with heating, an isothermal polymerization, or a polymerization at a constant temperature (adiabatic polymerization). The polymerization at a constant temperature may mean a polymerization method including a step of polymerizing using self-generated heat of reaction without optionally applying heat after adding an organometallic compound, and the polymerization with heating may mean a polymerization method including injecting the organometallic compound and then, increasing the temperature by optionally applying heat. The isothermal polymerization may mean a polymerization method by which the temperature of a polymer is kept constant by increasing heat by applying heat or taking heat after adding the organometallic compound.

In addition, according to an embodiment of the present invention, the polymerization of step (S1) may be performed by further including a diene-based compound of 1 to 10 carbon atoms in addition to the conjugated diene-based monomer, and in this case, effects of preventing the formation of gel on the wall of a reactor during operation for a long time may be achieved. The diene-based compound may be, for example, 1,2-butadiene.

The polymerization of step (S1) may be performed in a temperature range of 100° C. or less, 50° C. to 100° C., or 50° C. to 80° C. Within the range, the conversion ratio of the polymerization reaction may increase, the mooney viscosity, mooney stress relaxation ratio and weight average molecular weight of the above-described ranges may be satisfied while controlling the molecular weight distribution of a polymer, and the improving effects of physical properties may be excellent.

The active polymer prepared by step (S1) may mean a polymer in which a polymer anion and an organometallic cation are combined.

According to an embodiment of the present invention, the active polymer prepared by the polymerization of step (S1) may be a random copolymer, and in this case, effects of excellent balance between each of physical properties may be achieved. The random copolymer may mean the arrangement of repeating units forming a copolymer in disorder.

In addition, according to an embodiment of the present invention, the method for preparing a modified conjugated diene-based polymer may be performed in a plurality of reactors including two or more polymerization reactors and a modification reactor by a continuous type polymerization method. In a particular embodiment, step (S1) may be performed continuously in two or more polymerization reactors including a first reactor, and the number of the polymerization reactors may be flexibly determined according to reaction conditions and environments. The continuous type polymerization method may mean reaction processes of continuously supplying reactants to a reactor and continuously discharging reaction products thus produced. By the continuous type polymerization method, productivity and processability may be excellent, and effects of excellent uniformity of the polymer thus prepared may be achieved.

In addition, according to an embodiment of the present invention, in case where the active polymer is continuously prepared in the polymerization reactor, a polymerization conversion ratio in the first reactor may be 50% or less, from 10% to 50%, or from 20% to 50%, and within this range, side reactions generated while forming a polymer after initiating polymerization reaction may be restrained and a polymer with a branch structure may be induced during polymerization. Thus, the above-described mooney viscosity, mooney stress relaxation ratio and molecular weight distribution may be satisfied, and effects of excellent improvement of physical properties may be achieved.

In this case, the polymerization conversion ratio may be controlled according to the reaction temperature, the residence time in the reactor, etc.

The polymerization conversion ratio may be determined, for example, by measuring the solid concentration in a polymer solution phase including the polymer during polymerizing a polymer. In a particular embodiment, in order to secure the polymer solution, a cylinder type container is installed at the outlet of each polymerization reactor, and a certain amount of the polymer solution is filled in the cylinder type container. Then, the cylinder type container is separated from the reactor, the weight (A) of the cylinder filled with the polymer solution is measured, the polymer solution filled in the cylinder type container is transported to an aluminum container, for example, an aluminum dish, the weight (B) of the cylinder type container from which the polymer solution is removed is measured, the aluminum container containing the polymer solution is dried in an oven of 140° C. for 30 minutes, the weight (C) of a dried polymer is measured, and calculation is performed according to the following Mathematical Equation 1:

The term "polymerization reactant" in the present invention may mean an intermediate of a polymer type, which is under polymerization in each reactor during performing step (S1) or may mean a polymer with a polymerization conversion ratio of less than 90% under polymerization in a reactor, after finishing step (S1) or step (S2) and prior to obtaining an active polymer or a modified conjugated diene-based polymer.

Meanwhile, the polymerization of step (S1) may be performed by including a polar additive, and the polar additive may be added in a ratio of 0.001 g to 50 g, or 0.002 g to 0.1 g based on total 100 g of the monomer. In another embodiment, the polar additive may be added in a ratio of greater than 0 g to 1 g, 0.01 g to 1 g, or 0.1 g to 0.9 g based on total 100 g of the organometallic compound. In case of injecting the polar additive in the above-described range, the glass transition temperature, mooney viscosity and 1,2-vinyl bond content in the above-described ranges may be satisfied.

The polar additive may be, for example, one or more selected from the group consisting of tetrahydrofuran, 2,2-di(tetrahydrofuryl)propane, diethyl ether, cyclopentyl ether, dipropyl ether, ethylene methyl ether, ethylene dimethyl ether, diethyl glycol, dimethyl ether, tert-butoxy ethoxy ethane, bis(2-dimethylaminoethyl)ether, (dimethylaminoethyl)ethyl ether, trimethylamine, triethylamine, tripropylamine, and tetramethylethylenediamine, and may preferably be triethylamine, or tetramethylethylenediamine. If the polar additive is included, and if a conjugated diene-based monomer, or a conjugated diene-based monomer and an aromatic vinyl-based monomer are copolymerized, the difference of reaction rates may be compensated, and effects of inducing easy formation of a random copolymer may be achieved.

According to an embodiment of the present invention, in the reaction of step (S2), the modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:3, based on 1 mol of the organometallic compound in step (S1).

[Mathematical Equation 1]

$$\text{Polymer conversion ratio (\%)} = \frac{\text{Weight }(C)}{[(\text{Weight'}A] - \text{Weight}(B)) \times \text{total solid content of each reactor (wt \% }TSC)]} \times 100$$

Meanwhile, the polymer polymerized in the first reactor may be transported to polymerization reactors before a modification reactor in order, and polymerization may be performed until the final polymerization conversion ratio becomes 95% or more. After performing the polymerization in the first reactor, the polymerization conversion ratio in the second reactor, or each reactor from the second reactor to the polymerization reactor before the modification reactor may be appropriately controlled to control molecular weight distribution.

Meanwhile, in step (S1), during preparing an active polymer, the residence time of a polymer in the first reactor may be from 1 minute to 40 minutes, from 1 minute to 30 minutes, or from 5 minutes to 30 minutes, and within this range, the control of a polymerization conversion ratio is easy, and thus, the glass transition temperature, mooney viscosity, mooney stress relaxation ratio and phase difference index in the above-described ranges may be satisfied, and effects of improving physical properties may be excellent.

The molar ratio of the modifier and the organometallic compound, and the injection amount of the modifier in contrast to the monomer may substantially affect the glass transition temperature, mooney viscosity and mooney relaxation ratio of the polymer thus prepared, and an appropriate ratio within the above-described range may preferably be selected and applied if possible.

In addition, according to an embodiment of the present invention, the modifier may be injected into a modification reactor, and step (S2) may be conducted in the modification reactor. In another embodiment, the modifier may be injected into a transporting part for transporting the active polymer prepared in step (S1) to a modification reactor for conducting step (S2), and the reaction may be performed by the mixing of the active polymer and the modifier in the transporting part. In this case, the reaction may be modification reaction for simply coupling the modifier with the active polymer, or coupling reaction for connecting the active polymer based on the modifier, and the ratio of the modification reaction and the coupling reaction is required to be controlled as described above, and this may influence the mooney viscosity, mooney stress relaxation ratio, and the glass transition temperature.

In addition, in an embodiment of the present invention, the modification reaction in step (S2) may be performed by injecting the modifier not by in batch but by in at least two installments, and the modified conjugated diene-based polymer prepared thereby may satisfy the above-described physical properties at the same time. Particularly, in case of injecting the modifier in installments, the modifier firstly injected reacts with an active polymer primarily to form the polymer chain of a polymer having a high coupling number, and the modifier secondly injected reacts secondly with an unmodified active polymer remaining to additionally form the polymer chain of a polymer having a high coupling number, thereby producing a modified conjugated diene-based polymer having a coupling number of 3.2 or more and a mooney stress relaxation ratio of 0.4 or less. In this case, the separated modifier may be injected into a transport part and a modification reactor one by one, into a transport part one by one, or into a modification reactor one by one.

According to the present invention, a rubber composition including the modified conjugated diene-based polymer is provided.

The rubber composition according to the present invention is characterized in including the modified conjugated diene-based polymer and a filler, and may have a M10 value measured in an unvulcanized state based on ASTM D6746 of 5.0 kgf/cm$^2$ or more, and tensile strength of 7.0 kgf/cm$^2$ or more. Within these ranges, green strength may increase, tearing phenomenon during processing such as roll processing may be restrained, and processability may be excellent.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effects of excellent balance between physical properties may be achieved.

In addition, the rubber composition may further include other rubber components as necessary in addition to the modified conjugated diene-based polymer, and in this case, the rubber component may be included in an amount of 90 wt % or less based on the total weight of the rubber composition. In a particular embodiment, the rubber component may be included in an amount of 1 part by weight to 900 parts by weight based on 100 parts by weight of the modified conjugated diene-based copolymer.

The rubber component may be, for example, natural rubber or synthetic rubber, and may particularly be natural rubber (NR) including cis-1,4-polyisoprene; modified natural rubber which is obtained by modifying or purifying common natural rubber, such as epoxidized natural rubber (ENR), deproteinized natural rubber (DPNR), and hydrogenated natural rubber; and synthetic rubber such as styrene-butadiene copolymer (SBR), polybutadiene (BR), polyisoprene (IR), butyl rubber (IIR), ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acryl rubber, urethane rubber, silicone rubber, epichlorohydrin rubber, and halogenated butyl rubber, and any one or a mixture two or more thereof may be used.

The rubber composition may include a filler of 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon-based filler, if needed.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl)polysulfide or 3-trimethoxysilylpropylbenzothiazyltetrasulfide may be used in consideration of the improving effects of reinforcing properties.

In addition, in the rubber composition according to an embodiment of the present invention, since a modified conjugated diene-based polymer in which a functional group having high affinity with silica is brought in an active part is used as a rubber component, the mixing amount of the silane coupling agent may be smaller than a common case. Thus, the silane coupling agent may be used in an amount of 1 part by weight to 20 parts by weight, or 5 parts by weight to 15 parts by weight based on 100 parts by weight of silica. Within the above amount range, effects as a coupling agent may be sufficiently exhibited, and preventing effects of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of a rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may include a tire or a tire tread.

EXAMPLES

Hereinafter, the present invention will be explained in more detail referring to embodiments. Embodiments according to the present invention may be modified into various other types, and the scope of the present invention should not be limited to the embodiments described below. The embodiments of the present invention are provided for completely explaining the present invention to a person having an average knowledge in the art.

Example 1

To a first reactor among continuous reactors of three reactors connected in series, injected were a styrene solution in which 60 wt % of styrene was dissolved in n-hexane in a rate of 1.80 kg/h, a 1,3-butadiene solution in which 60 wt % of 1,3-butadiene was dissolved in n-hexane in a rate of 14.2 kg/h, n-hexane in a rate of 49.11 kg/h, a 1,2-butadiene solution in which 2.0 wt % of 1,2-butadiene was dissolved in n-hexane in a rate of 40 g/h, a solution in which 10 wt % of 2,2-di(2-tetrahydrofuryl)propane was dissolved in n-hexane as a polar additive in a rate of 51.0 g/h, and an initiator solution in which 10 wt % of n-butyllithium was dissolved in n-hexane in a rate of 59.0 g/h. At this time, the temperature of the first reactor was controlled to 50° C. and maintained. At a point where a polymerization conversion ratio reached 45%, the polymerization reactant thus obtained was transported to a second reactor via a transport pipe.

Then, a 1,3-butadiene solution in which 60 wt % of 1,3-butadiene was dissolved in n-hexane was injected into a second reactor in a rate of 0.74 kg/h, the temperature of the second reactor was maintained to 65° C., and polymerization was continued. At a point where a polymerization conversion ratio reached 95% or more, the polymerization reactant was transported from the second reactor to a third reactor via a transport pipe.

When transporting the polymerization reactant from the second reactor to the third reactor, a solution in which wt % of 3,3'-(piperazine-1,4-diyl)bis(N,N-bis(3-(trimethoxysilyl)propyl)propane-i-amine) (prepared referring to the description of KR Patent Application No. 10-2016-0172835) was dissolved in n-hexane as a modifier was injected into a transport part in a rate of 20.0 g/h, and then, was additionally added to the third reactor in a rate of 60 g/h. The temperature of the third reactor was maintained to 65° C.

Then, to the polymerization solution discharged from the third reactor, a solution in which 30 wt % of IR1520 (BASF Co.) was dissolved as an antioxidant was injected in a rate of 167 g/h and stirred. The polymer thus obtained was put into hot water heated with steam and stirred to remove solvents to obtain a modified conjugated diene-based polymer.

Example 2

A modified conjugated diene-based polymer was prepared by performing the same method in Example 1 except for injecting a modifier solution in which 20 wt % of tri(3-(trimethoxysilyl)propyl)amine (CAS No. 82984-63-3) was dissolved in n-hexane as a modifier in a rate of 23.0 g/h into a transport part for transporting from the second reactor to the third reactor, additionally injecting thereof to the third reactor in a rate of 47.2 g/h, and performing modification reaction.

Example 3

A modified conjugated diene-based polymer was prepared by performing the same method in Example 1 except for injecting a modifier in a rate of 40.0 g/h into the transport part, injecting to the third reactor in a rate of 40 g/h and performing modification reaction.

Comparative Example 1

A modified conjugated diene-based polymer was prepared by performing the same method in Example 1 except for not injecting the modifier into the transport part but injecting only into the third reactor in a rate of 80.0 g/h and performing modification reaction.

Comparative Example 2

A modified conjugated diene-based polymer was prepared by performing the same method in Example 2 except for not injecting the modifier into the transport part but injecting only into the third reactor in a rate of 80.0 g/h and performing modification reaction.

Comparative Example 3

A modified conjugated diene-based polymer was prepared by performing the same method in Example 2 except for maintaining the temperature of the first reactor to 70° C., transporting the polymerization reactant from the first reactor to the second reactor via the transport pipe at a point where the polymerization conversion ratio reached 80%, maintaining the temperature of the second reactor to 80° C., and transporting the polymer from the second reactor to the third reactor via the transport pipe at a point where the polymerization conversion ratio reached 95% or more.

Experimental Example 1

With respect to each of the modified conjugated diene-based polymers prepared in the Examples and Comparative Examples, 1,2-vinyl bond content, weight average molecular weight (Mw, ×10³ g/mol), molecular weight distribution (PDI, MWD), mooney viscosity (MV), mooney stress relaxation ratio (−S/R), and coupling number were measured, respectively, and the results are shown in Table 1 below.

1) 1,2-Vinyl Bond Content

The vinyl content in each polymer was measured and analyzed using Varian VNMRS 500 MHz NMR.

During measuring NMR, 1,1,2,2-tetrachloroethane was used as a solvent, and the 1,2-vinyl bond content (wt %) was calculated by calculating 5.97 ppm as a solvent peak, and regarding 7.2-6.9 ppm as random styrene peaks, 6.9-6.2 ppm as block styrene peaks, 5.8-5.1 ppm as 1,4-vinyl peaks, and 5.1-4.5 ppm as 1,2-vinyl peaks.

2) Weight Average Molecular Weight (Mw), Number Average Molecular Weight (Mn), Molecular Weight Distribution (MWD) and Coupling Number By gel permeation chromatography (GPC) analysis, a weight average molecular weight (Mw) and a number average molecular weight (Mn) were measured and molecular weight distribution (PDI, MWD, Mw/Mn) was calculated from each molecular weight thus measured. Particularly, GPC was conducted using two columns of PLgel Olexis (Polymer Laboratories Co.) and one column of PLgel mixed-C (Polymer Laboratories Co.) in combination, and polystyrene (PS) as a GPC standard material for calculating the molecular weights. A solvent for measuring GPC was prepared by mixing tetrahydrofuran with 2 wt % of an amine compound.

In addition, a coupling number was obtained by collecting a partial polymer prior to injecting a modifier in each of the Examples and Comparative Examples, obtaining a peak molecular weight (Mp1) of a polymer, obtaining a peak molecular weight (Mp2) of each modified conjugated diene-based polymer, and calculating by the following Mathematical Equation 2:

$$\text{Coupling number } (C \cdot N) = Mp_2/Mp_1 \quad \text{[Mathematical Equation 2]}$$

3) Mooney Viscosity (MV) and Mooney Stress Relaxation Ratio (−S/R)

The mooney viscosity (MV, (ML1+4, @110° C. MU)) was measured by using MV-2000 (ALPHA Technologies Co.) using Large Rotor at a rotor speed of 2±0.02 rpm at 110° C. In this case, a specimen used was stood at room temperature (23±3° C.) for 30 minutes or more, and 27±3 g of the specimen was collected and put in a die cavity, and then, Platen was operated for 4 minutes for measurement. After measuring the mooney viscosity, the slope value of the change of the mooney viscosity shown while releasing torque was measured, and the mooney relaxation ratio was obtained.

TABLE 1

| | GPC | | | | |
|---|---|---|---|---|---|
| Division | Mw (× 10³ g/mol) | MWD | C.N. | MV | −S/R |
| Example 1 | 1018 | 1.83 | 4.3 | 99.7 | 0.262 |
| Example 2 | 848 | 1.72 | 3.7 | 87.0 | 0.345 |
| Example 3 | 861 | 1.89 | 3.4 | 94.8 | 0.281 |
| Comparative Example 1 | 755 | 1.82 | 3.1 | 92.0 | 0.455 |
| Comparative Example 2 | 691 | 1.81 | 2.8 | 73.0 | 0.491 |
| Comparative Example 3 | 1011 | 2.24 | 3.6 | 104.5 | 0.258 |

As in Table 1 above, the modified conjugated diene-based polymers of Example 1 to Example 3 showed physical properties as follows: the mooney viscosity measured at 110° C. of 75 to less than 100; the mooney stress relaxation ratio of 0.4 or less; the weight average molecular weight of 750,000 g/mol or more; and the molecular weight distribution of 1.0 to 2.0.

On the contrary, the modified conjugated diene-based polymer of Comparative Example 1 showed the mooney stress relaxation ratio of greater than 0.4, the modified conjugated diene-based polymer of Comparative Example 2 showed the weight average molecular weight of less than 750,000 g/mol, the mooney viscosity of less than 75, and the mooney stress relaxation ratio of greater than 0.4, and the modified conjugated diene-based polymer of Comparative Example 3 showed the molecular weight distribution of 2.0 or more and the mooney viscosity of 100 or more, and the conditions suggested in the present invention were not satisfied at the same time.

Example 4

100 parts by weight of the modified conjugated diene-based polymer prepared in Example 1, 70 parts by weight of silica, 11.2 parts by weight of an organic silane coupling agent (X50S, Evonik), 37.5 parts by weight of a process oil (TADE oil), 3 parts by weight of zinc oxide (ZnO), 2 parts by weight of stearic acid, 2 parts by weight of an antioxidant (TMQ (RD); 2,2,4-trimethyl-1,2-dihydroquinoline polymer), 2 parts by weight of an antiaging agent (6PPD; (dimethylbutyl)-N-phenyl-phenylenediamine) and 1 part by weight of wax (Microcrystaline Wax) were mulled. In this case, the initial temperature was controlled to 70° C., and after finishing mixing, a first compound mixture was obtained at a discharge temperature of 145° C. to 155° C. Then, the first compound mixture was cooled to room temperature, and 1.5 parts by weight of a sulfur powder, 1.75 parts by weight of a rubber accelerator (DPG; diphenylguanidine), and 2 parts by weight of a vulcanization accelerator (CZ; N-cyclohexyl-2-benzothiazylsulfenamide) were added and mixed at a temperature of 100° C. or less to obtain a second compound mixture. Then, via a curing process at 160° C. for 20 minutes, a rubber specimen was formed through a roller processing.

Example 5

First and second compound mixtures were obtained and a rubber specimen was formed by the same method described in Example 4 except for using the modified conjugated diene-based polymer prepared in Example 2 instead of the modified conjugated diene-based polymer prepared in Example 1.

Example 6

First and second compound mixtures were obtained and a rubber specimen was formed by the same method described in Example 4 except for using the modified conjugated diene-based polymer prepared in Example 3 instead of the modified conjugated diene-based polymer prepared in Example 1.

Comparative Example 4

First and second compound mixtures were obtained and a rubber specimen was formed by the same method described in Example 4 except for using the modified conjugated diene-based polymer prepared in Comparative Example 1 instead of the modified conjugated diene-based polymer prepared in Example 1.

Comparative Example 5

First and second compound mixtures were obtained and a rubber specimen was formed by the same method described in Example 4 except for using the modified conjugated diene-based polymer prepared in Comparative Example 2 instead of the modified conjugated diene-based polymer prepared in Example 1.

Comparative Example 6

First and second compound mixtures were obtained and a rubber specimen was formed by the same method described in Example 4 except for using the modified conjugated diene-based polymer prepared in Comparative Example 3 instead of the modified conjugated diene-based polymer prepared in Example 1.

Experimental Example 2

Figure 1A:
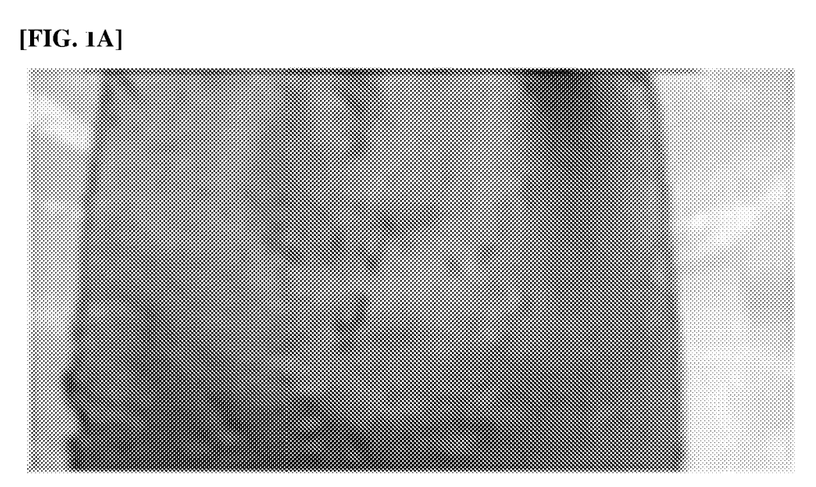
FIG. 1A is a photographic image on a rubber specimen with no rough border and no tearing.
Figure 1B:
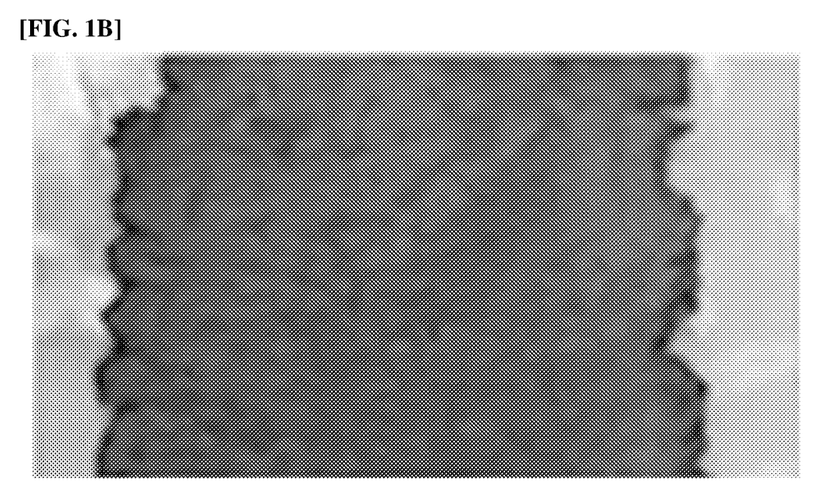
FIG. 1B is a photographic image on a rubber specimen with rough border and no tearing.
Figure 1C:
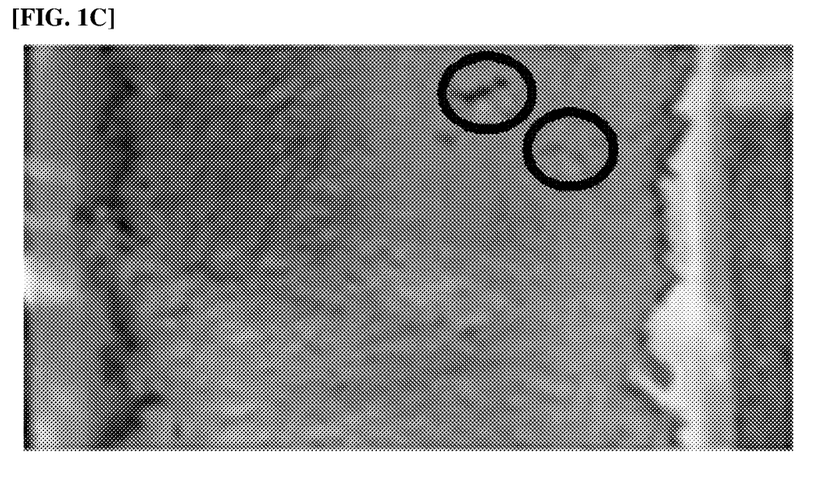
FIGS. 1C and 1D are photographic images on rubber specimens with rough border and tearing.
Figure 1D:
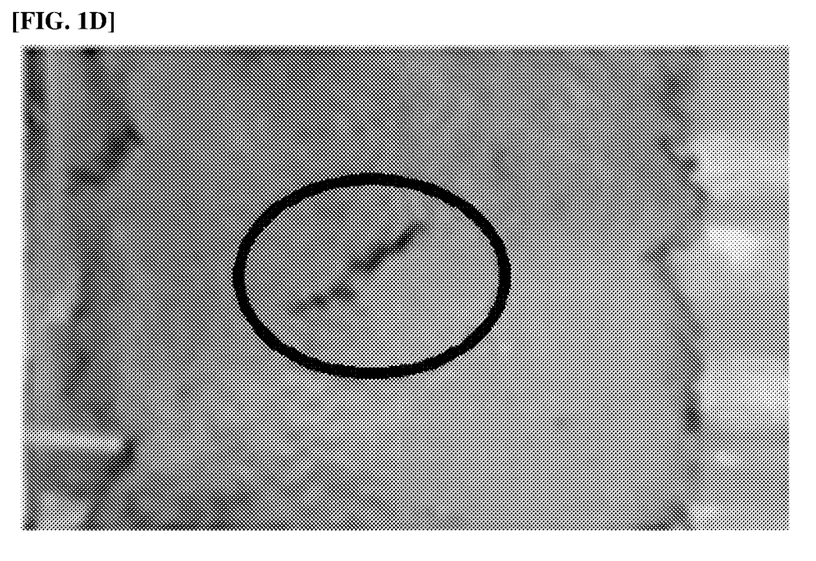

In order to comparatively analyze the physical properties of each rubber composition prepared in the Examples and Comparative Examples, the first compound mixture obtained during preparing each rubber composition was taken, M10 and tensile strength were measured, and processability properties were measured using the rubber specimen, and the results are shown in Table 2 below.
1) M10 and Tensile Properties Each specimen was formed based on the test method of ASTM D6746, and the tensile strength when broken and tensile stress when stretched by 10% (10% modulus, M10) were measured. Particularly, tensile properties were measured using a Universal Test Machin 4204 tensile tester (Instron Co.) in a rate of 50 cm/min at room temperature.
2) Processability Properties The processability properties were evaluated by observing the tearing degree of a rubber specimen and the roughness degree of a border on a roller during forming the rubber specimen through a roller processing from each second mixture compound with the naked eye, and were designated by 0 if there were no rough border and no tearing as in FIG. 1A, A if there were rough border and no tearing as in FIG. 1B, and X if there were rough border and tearing as in FIG. 1C.

TABLE 2

| Division | Tensile properties | | Processability properties |
|---|---|---|---|
| | Tensile strength (kgf/cm$^2$) | 10% modulus (M10, kgf/cm$^2$) | |
| Example 4 | 8 | 5.7 | ○ |
| Example 5 | 7.6 | 5.4 | ○ |
| Example 6 | 10 | 5.9 | ○ |
| Comparative Example 4 | 4.8 | 4.8 | Δ |
| Comparative Example 5 | 4.1 | 4.1 | X |
| Comparative Example 6 | 6.5 | 4.6 | Δ |

As shown in Table 2 above, Example 4 to Example 6 according to embodiments of the present invention showed the 10% modulus before vulcanization of 5.0 kgf/cm$^2$ or more, and the tensile strength of 7.0 kgf/cm$^2$ or more, and consequently, tearing phenomenon during roller processing was not generated.

In contrast, in cases of Comparative Example 4 to Comparative Example 6, the 10% modulus before vulcanization was less than 5.0 kgf/cm$^2$, the tensile strength was less than 7.0 kgf/cm$^2$, and tearing phenomenon during roller process was severely generated.

In this case, Examples 4 to 6 included the modified conjugated diene-based polymers of Examples 1 to 3 of which mooney viscosity, mooney stress relaxation ratio, weight average molecular weight, and molecular weight distribution were controlled to specific ranges suggested in the present invention at the same time, and Comparative Example 4 to Comparative Example 6 included the modified conjugated diene-based polymers of Comparative Examples 1 to 3 of which at least one or more among mooney viscosity, mooney stress relaxation ratio, weight average molecular weight, and molecular weight distribution were not controlled to specific ranges suggested.

The results mean that the modified conjugated diene-based polymer of the present invention has mooney viscosity, a mooney stress relaxation ratio, a weight average molecular weight, and molecular weight distribution controlled in specific ranges, and if applied to a rubber composition, the modulus and tensile strength of the rubber composition may be controlled to specific ranges, and the green strength of the rubber composition may be improved, thereby achieving the improving effects of processability.

The invention claimed is:
1. A modified conjugated diene-based polymer satisfying the following conditions of i) to iv):
  i) a mooney viscosity from 75 to less than 100 (MV, (ML1+4, @110° C. MU)), wherein the mooney viscosity measured in accordance with ASTM D1646 at 110° C.,
  ii) a mooney stress relaxation ratio of 0.4 or less, wherein the mooney stress relaxation ratio is measured at 110° C.,
  iii) a weight average molecular weight (Mw) of 750,000 g/mol or more; and
  iv) a molecular weight distribution (MWD) from 1.0 to 2.0, wherein the MWD is a ratio of Mw to the number average molecular weight (Mn),
  wherein the polymer has a coupling number of 3.2 or more; and wherein the polymer has a 1,2-vinyl bond content from 5 wt % to 30 wt %, and wherein the polymer has a unimodal shape molecular weight distribution curve by gel permeation chromatography.

2. The modified conjugated diene-based polymer of claim 1, wherein the mooney viscosity is from 85 to less than 100 (MV, (ML1+4, @110° C. MU)).

3. The modified conjugated diene-based polymer of claim 1, wherein the molecular weight distribution is from 1.5 to 2.0.

4. The modified conjugated diene-based polymer of claim 1, wherein the mooney stress relaxation ratio is 0.35 or less.

5. The modified conjugated diene-based polymer of claim 1, wherein the modified conjugated diene-based polymer comprises silicon (Si) atom and nitrogen (N), and wherein the Si content and the N content are 50 ppm or more, respectively, with respect to a total weight of the polymer.

6. A rubber composition, comprising:

the modified conjugated diene-based polymer of claim 1; and a filler.

7. The rubber composition of claim 6, wherein the rubber composition comprises 0.1 parts by weight to 200 parts by weight of the filler based on 100 parts by weight of the modified conjugated diene-based polymer.

8. The rubber composition of claim 6, wherein the composition has a 10% modulus (M10) value measured in an unvulcanized state of 5.0 kgf/cm$^2$ or more, and a tensile strength of 7.0 kgf/cm$^2$ or more, wherein the M10 value and the tensile strength are based on specimens prepared in accordance with ASTM D6746.

9. The rubber composition of claim 6, wherein the filler is a silica-based filler or a carbon black-based filler.

* * * * *